(12) United States Patent
Lu et al.

(10) Patent No.: US 6,629,490 B1
(45) Date of Patent: Oct. 7, 2003

(54) SMART WINE BREWERY EQUIPMENT

(76) Inventors: Shun-Tsung Lu, No. 112, Shiejung St., Shiecheng Village, Shinshe Shiang, Taichung Hsien (TW); Ta-Wei Lu, 2719 E. Belmont Ct., Brea, CA (US) 92621

( * ) Notice: Subject to any disclaimer, the term of this patent is extended or adjusted under 35 U.S.C. 154(b) by 0 days.

(21) Appl. No.: 10/101,967
(22) Filed: Mar. 21, 2002
(51) Int. Cl.[7] .............................. A23L 1/00; A47J 27/00; C12H 1/00; C12C 13/00
(52) U.S. Cl. ........................... 99/276; 99/277; 99/277.1
(58) Field of Search ..................... 99/276, 277, 277.1, 99/277.2, 278

(56) References Cited

U.S. PATENT DOCUMENTS 3,760,711 A * 9/1973 Webster ..................... 99/277.1
6,019,034 A * 2/2000 Ford, Sr. ................... 99/277.1 X
6,032,571 A * 3/2000 Brous et al. ................ 99/277.2

FOREIGN PATENT DOCUMENTS

DE   3333541   * 4/1985   ................. 99/277

* cited by examiner

Primary Examiner—Reginald L. Alexander
(74) Attorney, Agent, or Firm—Rosenberg, Klein & Lee

(57) ABSTRACT

Smart brewery equipment mainly comprises a frame, at least a storing barrel, a ferment tun and a distilling barrel, where the ferment tun has a ferment cask with a filter and a compression apparatus. The compression apparatus is employed to secure air seal between the top lid and the ferment cask to ensure the successful process of fermentation. The distilling barrel constitutes a distilling cask, a compression apparatus and a cooling piping. The compression apparatus is designed to ensure the air seal between the top lid and the distilling cask. The top lid has a space inside to receive the cooling piping which cools down the steam wine into the finished wine, which flows out, to the storing barrel ready for drinking.

14 Claims, 6 Drawing Sheets

SMART WINE BREWERY EQUIPMENT

BACKGROUND OF THE INVENTION

1. Field of the Invention

The invention relates to a complete set of smart wine brewery equipment, in particular for making wine and pure water by DIY process.

2. Description of the Prior Art

In most cases, the wine brewery requires large-scaled equipment and a great stock of raw materials, such as rice and fruit, and the selling price is monopolized. The drinkers have no way to pick the taste and the alcohol grade they prefer. The consumers are not permitted to bargain the selling price the seller sets for. Moreover, there are illegal vendors who are selling moonshined wines or methyl alcohol extremely hazardous to the health of drinkers. The drinkers have to give a second thought before drinking the wine.

Furthermore, it happens more than often in the house that the fruit bought for festivals or in a certain season cannot be consumed, so there are many leftovers, which become spoilt after a few days. These fruit leftovers are good raw materials for brewing wine if there is smart brewery equipment available in the home.

How to design small-scaled smart brewery equipment, simply operated in the house to convert the excessive fruit into a homemade wine is a major concern of the industry.

The inventor has been working hard for years on the study of simplified brewery equipment and finally come up with the brewery equipment provided in the invention.

SUMMARY OF THE INVENTION

The main object of the invention is to provide smart brewery equipment portable for use indoors and outdoors.

Another object of the invention is to provide smart brewery equipment for brewing the homemade wine with the taste and the alcohol grade the drinker likes best.

Another object of the invention is to provide smart brewery equipment with a distiller for indoor and outdoor operation.

To achieve the above-mentioned objects, the smart brewery equipment mainly comprises a frame, and at least a storage barrel, a ferment tun and a distilling barrel, where the ferment tun contains a filter and a press apparatus with a top lid to cover the ferment tun. The distilling barrel contains hollow space within the center and a press apparatus linked with a top lid to cover the distilling barrel. The top lid provides space for installing cooling piping, which is employed to drain off the wine for immediate drinking.

BRIEF DESCRIPTION OF THE DRAWINGS

The drawings disclose an illustrative embodiment of the present invention which serve to exemplify the various advantages and objects hereof, and are as follows.

DETAILED DESCRIPTION OF THE PREFERRED EMBODIMENT

Figure 1:
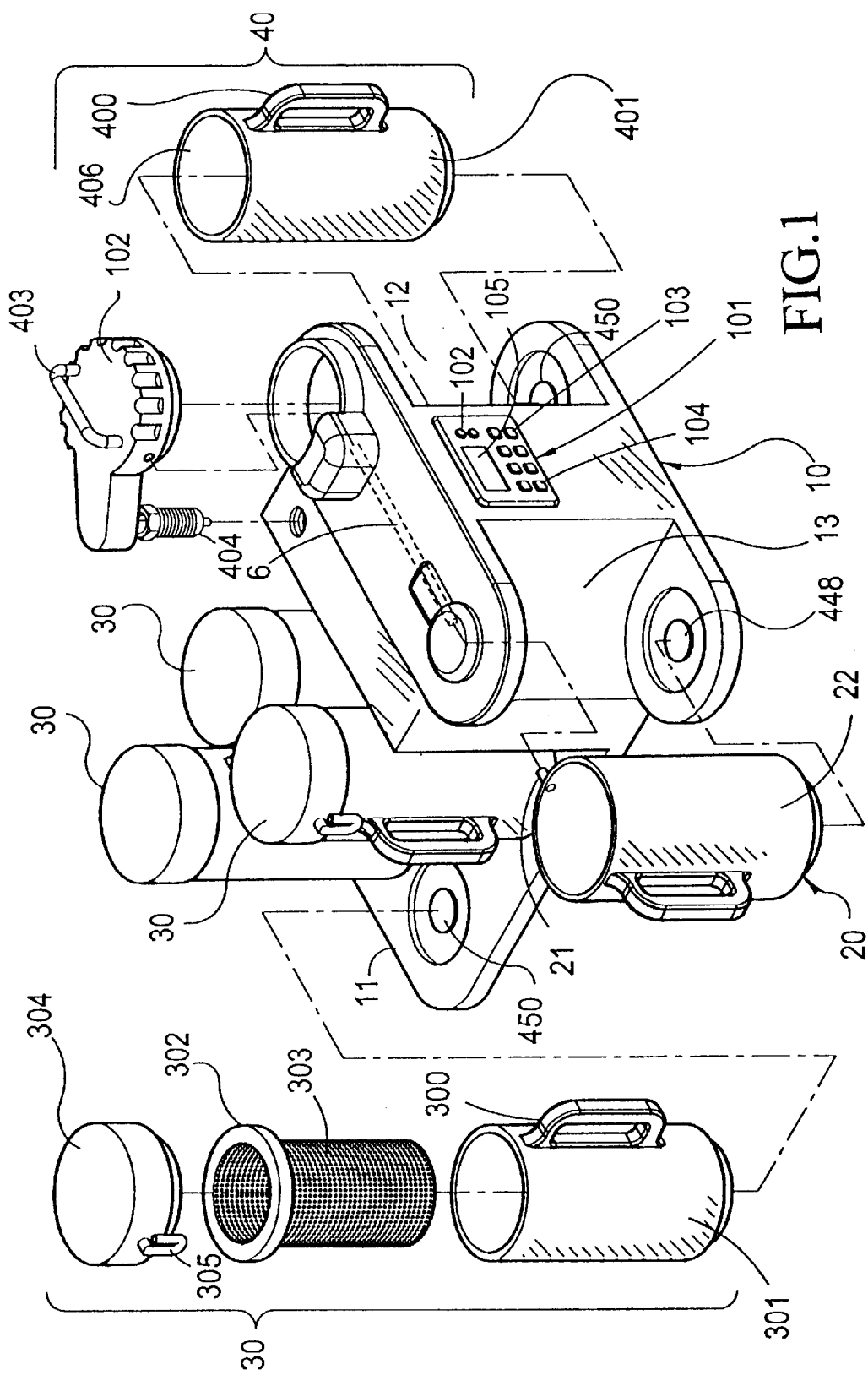
FIG. 1 shows a disassembly of the smart brewery equipment of the invention.
Figure 2:
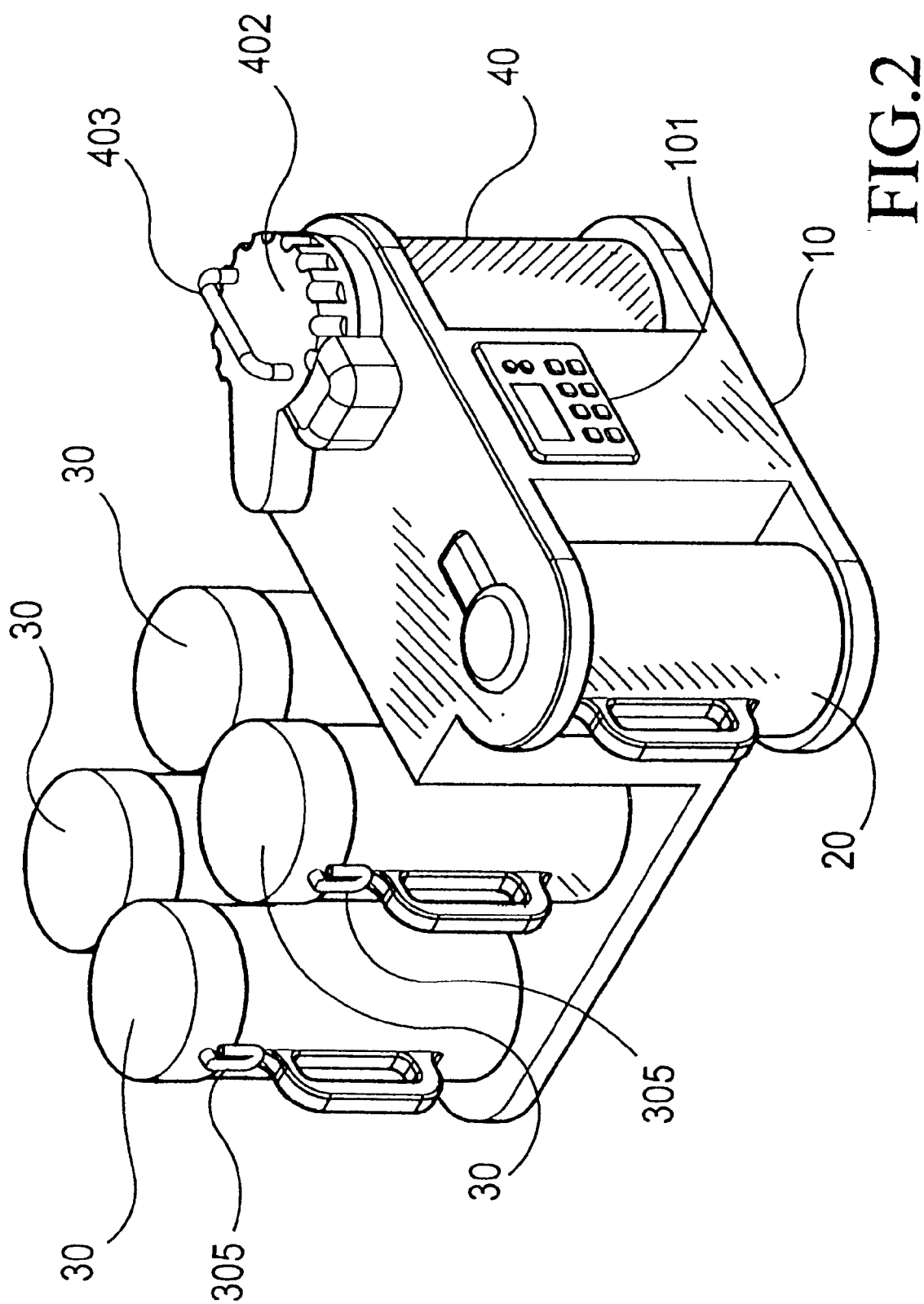
FIG. 2 shows an assembly of the smart brewery equipment of the invention.

As shown in FIGS. 1 and 2, the smart brewery equipment of the invention mainly comprises a frame 10, at least a storage barrel 20, a ferment tun 30 and a distilling barrel 40. The frame 10 has a rear platform 11, the first front platform 12 and the second front platform 13. Both the first front platform 12 and the rear platform 11 provide at least a heater 14 on the bottom plate. The storage barrel 20 is received in the second front platform 13. The storage barrel 20 has an intake 21 and storing space 22. The ferment tun 30 is received on the rear platform 11 of the frame 10 (see FIG. 3), including the ferment cask 301 which is constructed of two layers of cask walls and the room between two walls is stuffed with insulation material or left in a form of vacuum, and a handle 300 is outfitted on the border of the ferment cask 301. Inside of the ferment cask 301, there is a filter pouch 302 perforated with filtering holes 303 to receive the raw material 50 and permit the fermented fluid 51 to flow into the ferment cask 301. The draff is drained out of the filter poach 302 and the filter poach 302 is cleaned for reuse. The top of the ferment cask 301 links with an airtight lid 304, which has an air vent 305 inside the lid. The distilling barrel 40 is installed on the first front platform 12 of the frame 10, which comprises a distilling cask 401 having two walls and in-between room filled with insulation material or left in vacuum, a handle 400 on the edge of the distilling cask 401 (the size of the ferment cask 301 is identical with that of the distilling cask 401), a top lid 402 mounted on the top of the distilling cask 401, a handle 403 fixed on the top of the top lid 402 for the user to cover/open the top lid 402, a compression apparatus 404 linked to one side of the top lid 402, and the cooling piping 405 linked to the distilling cask 401. A hollow space 406 is formed inside the distilling cask 401. A reserved side of the top lid 402 is extended to link with the compression apparatus 404. With the compression apparatus 404, the top lid 402 is sealed on the distilling cask 401. The top lid 402 has sufficient space for installing cooling piping 405, which transfers the finished wine 52 to the storage barrel 22 via the pipe 6 and intake 21 ready for decanting and drinking.

The frame 10 is in a cabinet shape with a control panel 101, on which the power switch 102, the timer 103, the temperature control 104 and indication lights 105 are displayed. The indication lights 105 show working conditions of the power switch 102, the timer 103 and the temperature control 104.

Figure 3:
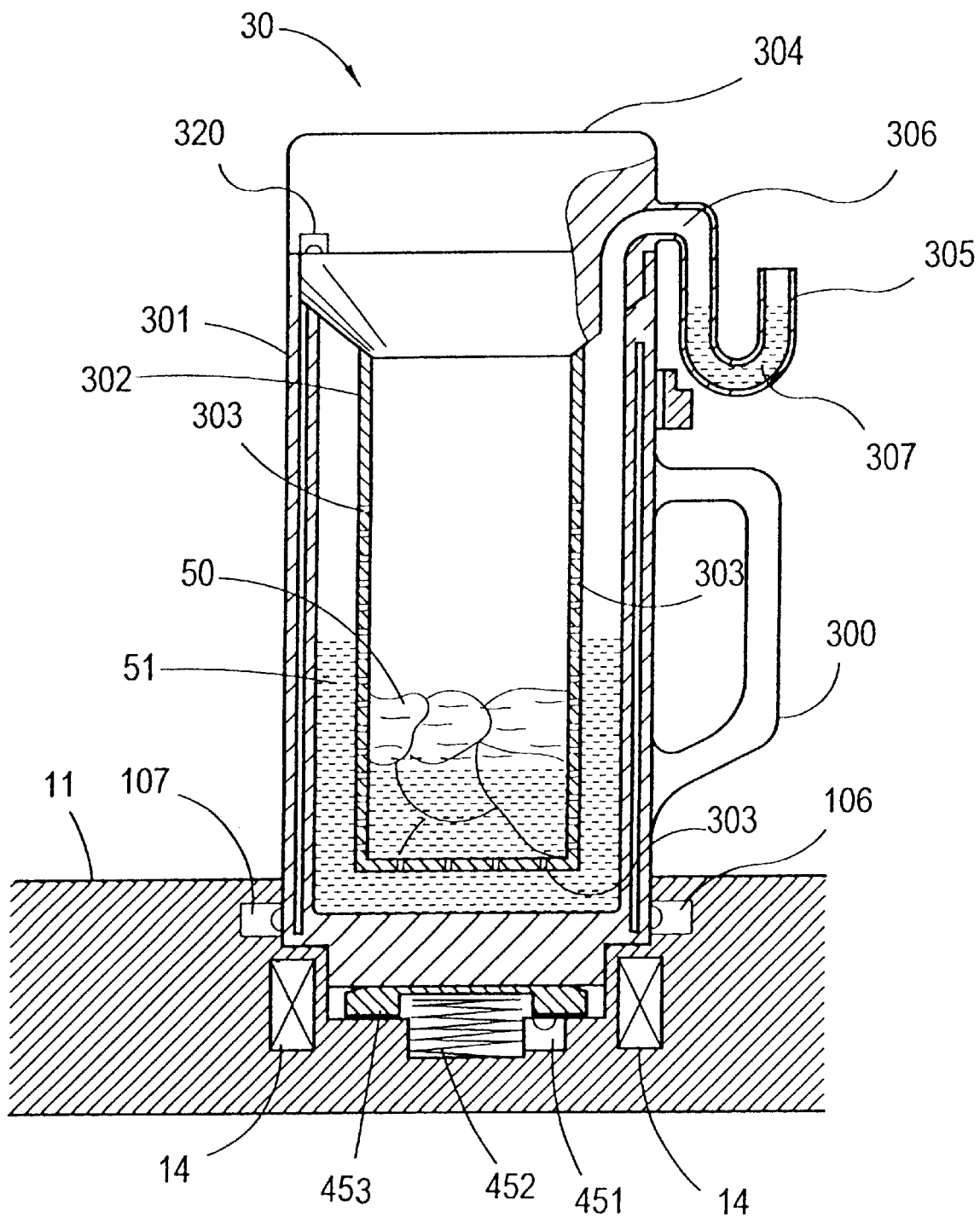
FIG. 3 shows a cross-section of the smart brewery equipment of the invention.

As shown in FIG. 3, the air vent 305 is mounted on one side of the top lid 304. The air vent 305 is a U tube trap with one air channel 306 linked to the ferment cask 301 and the U trap is filled with a fixed amount of fluid 307 (it may be a bactericide). The air vent 306 works to release the gas produced in the process of fermentation in the ferment cask 301. The gas released from the ferment cask 301 and the air entering the ferment cask 301 through the air vent 305 will be filtered by the fluid 307, which acts as reverse osmosis to prevent the fermented material in the ferment cask 301 from acidification, so the gas is always kept environmentally friendly.

Figure 5:
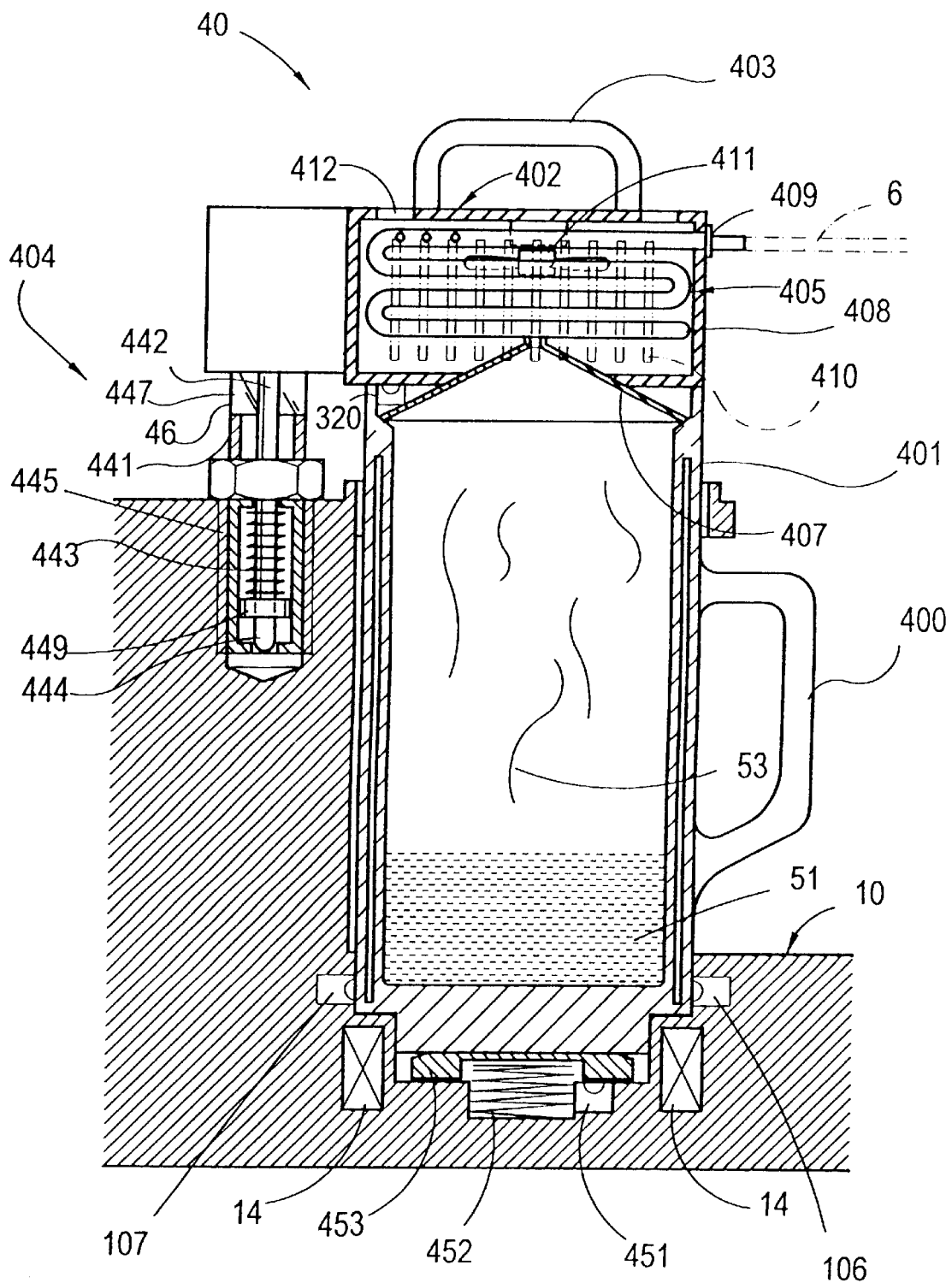
FIG. 5 shows a cross-section of the distilling barrel of the smart brewery equipment of the invention.

As shown in FIGS. 3 and 5, the heaters 14 on the first front platform 12 and the rear platform 11 are connected to the power switch 102, the timer 103, the temperature control 104 and the indication lights 105. When the power switch 102 is turned on, the heater 14 begins to distill the fermented fluid 51. The timer 103 will be set to cut off the power at the moment when the fermented fluid 51 loses a quarter of volume. The distilling operation ensures the best quality of wine the brewer expects to have.

Figure 6:
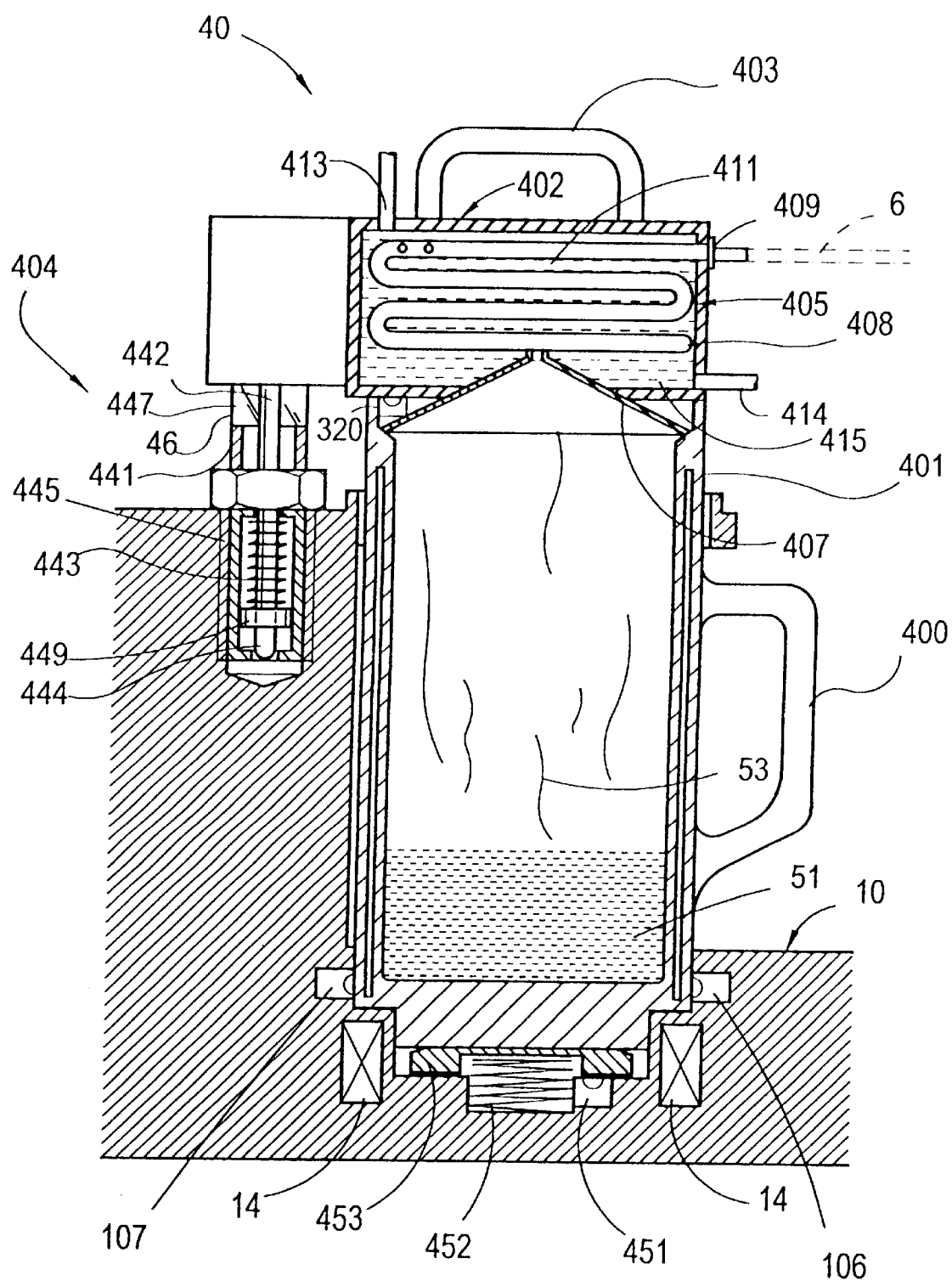
FIG. 6 shows a partial cross-section of the distilling barrel of the smart brewery equipment of the invention.

On the bottom of the first front platform 12 and the rear platform 11, there outfits at least one thermal reset sensor 106 linked with the temperature control 104. The thermal reset sensor 106 tries to maintain the heating temperature between 90° C.–110° C. Whenever the heating temperature in the distilling cask 401 comes down less than 90° C., the thermal reset sensor 106 starts the temperature control 104 and the heater 14, or whenever the temperature rises more than 110° C., the thermal reset sensor 106 cuts off the power switch 102 and the heater 14. There is another safety sensor 107 mounted on the first front platform 12 and the rear platform 11 and linked to the heater 14 to prevent the empty heating or over heating in the distilling cask 401. These two sensors are a double protection. In addition, there is a weight sensor 451 mounted on the bottom plate of the first front platform 12 and the rear platform 11 for receiving the ferment cask 301 and the distilling cask 401 respectively. The weight sensor 451 is supported by a buffer 452 and actuated by weight plate 453. As shown in FIGS. 3, 5 and 6, when a certain weight is placed on the weight plate 453, the buffer 452 is therefore compressed, then the weight plate 453 actuates the weight sensor 451, which in turn activates the thermal reset sensor 106 and the safety sensor 107. That is to say, the heater 14 begins to work only if the ferment cask 301 and the distilling cask 401 are placed on the top of the buffer 452. It is another safety protection of the invention.

Figure 4:
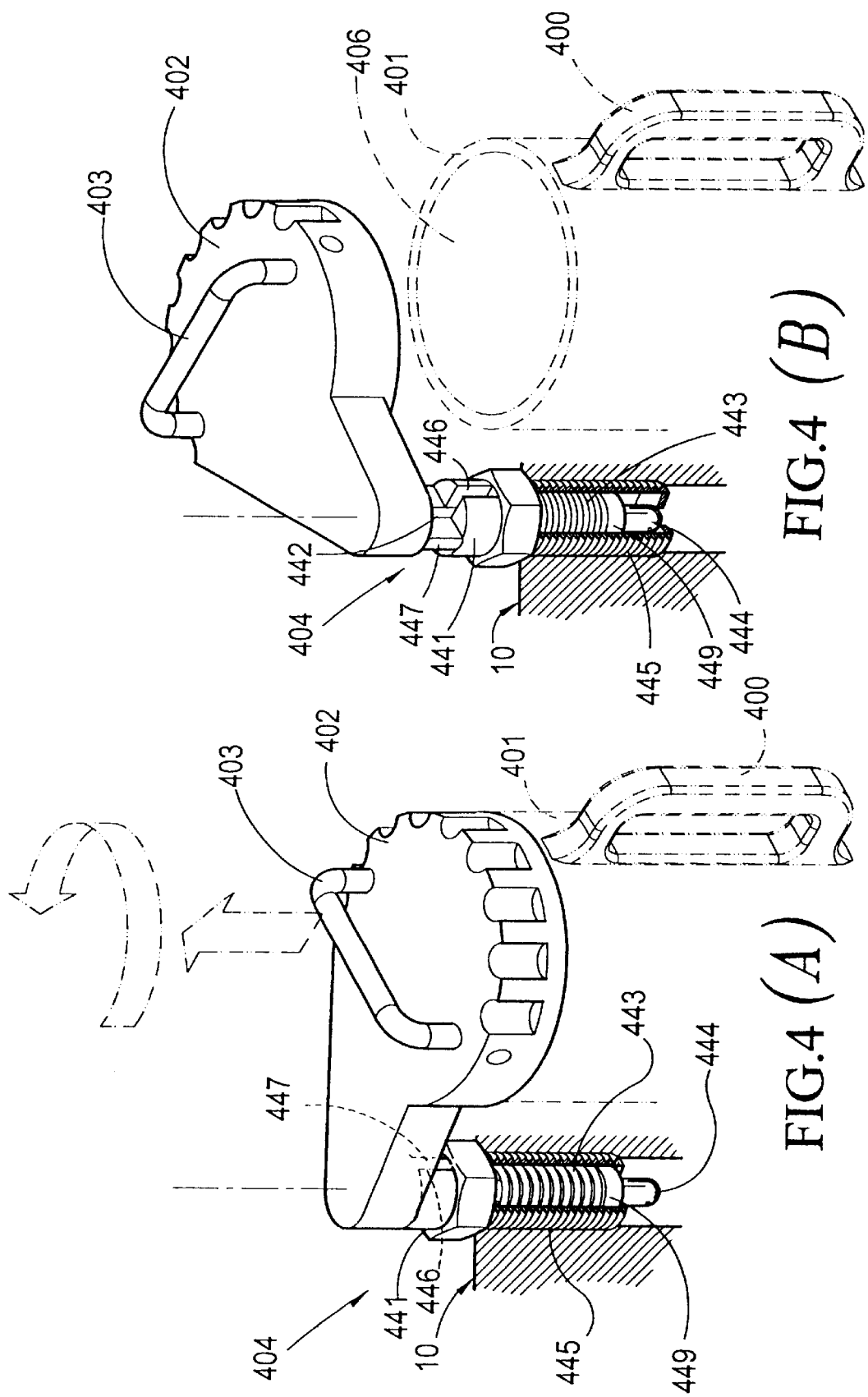
FIGS. 4(A) and (B) show the application of the press apparatus of the smart brewery equipment of the invention.

Please refer to FIGS. 4(A) and (B), the compression apparatus 404 is composed of a hollow casing 441, a mobile element 442, and a compression element 443. One end of the mobile element 442 extends into the top lid 402 of the distilling cask 401, and the other end is a free end 444. The lower part of the hollow casing 441 is drilled with a male thread 445 to be screwed and locked firmly in the frame 10. The mobile element 442 is fixed in the top lid 402 with a catch block 447, which is received in the groove 446. The free end 444 of the mobile element 442 will pierce through the hollow casing 441 and the compression element 443. In this embodiment, the compression element 443 is a spring coil held by the free end 444 of the mobile element 442 within the hollow casing 441. There outfits a stop plate 449 at the lower free end 444 of the hollowing casing 441. When the mobile element 442 brings upward the top lid 402 and the distilling cask 401 together, the stop plate 449 will compress the spring with the hollow casing 441 to reserve a coil force. This coil force keeps the top lid 402 closely sealed with the distilling cask 401. The stop plate 449 will fix in the groove 446. The catch block 447 holds the hollow casing 441 on the top of the groove 446; in this moment; the compression element 443 still preserves a great coil force.

When it is intended to close the top lid 402, just slightly turn the top lid 402 transversely to the groove 446, and the coil force of the compression element 443 will return the top lid 402 to the airtight position.

As shown in FIG. 5 the cooling piping 405 consists of a collection cap 407 linked with the distilling cask 401, a transfer pipe 408 with one end internally linked with the collection cap 407 and other end with a water valve 409 outside the top lid 402. The collection cap 407 is in the form of a funnel to collect the steam 53 evaporated from the heated fermented fluid 51 and transfer the stream 53 to the transfer pipe 408. The transfer pipe 408 is a bending design. When the steam 53 enters the transfer pipe 408, it gradually cools to become finished wine 52 and goes to the storing barrel 22 via the water valve 409 and the pipe 6.

The top lid 402 on the distilling cask 401 of the distilling barrel 40 is composed of a plurality of sink fins 410. With the design of the cooling element 411 which is an electronic fan, the condensing effect of the finished wine 52 in the transfer pipe 408 can be speeded up. There is an air vent 412 on the top lid 402 of the cooling element 411 so as to keep the free air circulation within the top lid 402.

As shown in FIG. 6, a design change is made in such a manner that on the cooling element 411, the top lid 402 is filled and flowed with a cooling agent 415 with an inlet 413 and outlet 414 to achieve a fast cooling and condensing effect for the finished wine 52. It is also preferable to install a cooler 448 on the bottom plate of the second front platform 13 to differ the temperature between the storing barrel 22 and the distilling cask 401. This way will enhance the evaporation effect and gain more wine in production.

It is preferable to install another touch switches 320 and 420 on the airtight lid 304 and the top lid 402 respectively for the ferment tun 30 and the distilling barrel 40 as shown in FIGS. 1, 5 and 6. This is another safety protection of the invention. Even though the ferment cask 301 and the distilling cask 401 are placed on the frame 10, the heater 14, the thermal reset sensor 106, the safety sensor 107 and weight sensor 109 are all on, the equipment would not work as long as the airtight lid 304 and 402 are not closed securely and the touch switches 320 and 420 are not activated.

The invention is versatile both for AC or DC power, operated with wall socket in home or the battery power on vehicle with high mobility.

ADVANTAGES AND BENEFITS

Comparing with the prior art, the invention dominates the following advantages:

1. The brewery equipment of the prior art is bulky, suitable only for the large-scale brewery plant, not for DC power. The brewery equipment of the invention is compact, suitable for use in home as well as the DC power in a car for outdoor activity, there is no comparison.

2. The brewery equipment is easy to clean, good for outdoor operation. It is also operated to produce the pure steamed water as the drinking water.

3. The taste and alcohol grade of the finished wine can be changeable entirely coping with the drinker preference. It is a DIY product, and drinker, not the brewer, controls its price. The size of the ferment tun and the distilling barrel is changeable with no limit.

4. The ferment tun or the distilling barrel can be used independently, or in combination, and the taste and the alcohol grade is adjustable. This invention is three in one, no comparison available at all.

Many changes and modifications in the above-described embodiment of the invention can, of course, be carried out without departing from the scope thereof. Accordingly, to promote the progress in science and the useful art, the invention is disclosed and is intended to be limited only by the scope of the appended claims.

What is claimed is:

1. A smart brewery equipment, comprising:
  a frame including a rear platform, a first front platform and a second front platform, a bottom plate of said rear platform and said first front platform outfitted with a heater;

at least a storing barrel with an intake at one side, placed on said second front platform;

at least a ferment tun, composed of a ferment cask, a suspension filter with perforated filtering holes on rims and a bottom, an airtight lid and an air vent linked in and out;

at least a distilling barrel including a distilling cask, a top lid, a compression apparatus mounted on one side of said distilling barrel, cooling piping linked in and out, said distilling barrel having a go-between space, an extension of said top lid used for installing said compression apparatus capable of rendering air seal of said top lid against said distilling barrel, said top lid providing sufficient space for receiving said cooling piping, finished wine in said cooling piping flowing into said intake of a storing barrel.

2. The brewery equipment of claim 1, wherein said frame is in a form of a cabinet with a control panel, on said control panel, a power switch, timer, temperature control and indication lights are displayed, a heater is connected to said power switch, timer, temperature control and indication lights, said indication lights show working conditions of said power switch, timer, temperature control and presetting.

3. The brewery equipment of claim 1, wherein a cooling element is provided on a bottom plate of said second front platform.

4. The brewery equipment of claim 1, wherein said bottom plate of said first front platform, second front platform and rear platform provides at least a weight sensor.

5. The brewery equipment of claim 1, wherein said bottom plate of said first front platform and rear platform provides at least a safety sensor.

6. The brewery equipment of claim 1, wherein said bottom plate of said first front platform and rear platform provides at least a thermal reset sensor.

7. The brewery equipment of claim 1, wherein a compression apparatus consists of a hollow casing, a mobile element and a compression element, said mobile element having one end extended to said top lid and a free end, a lower part of said hollow casing drilled with a male thread and a upper part with a groove, said male thread screwed and locked in said frame, a tip of said mobile element having a catch fitting into said groove in said top lid, said free end of said mobile element piercing through said hollow casing and said compression element as well.

8. The brewery equipment of claim 1, wherein an air vent is a U type trap filled with fixed amount of fluid, having two outlet ends facing upward.

9. The brewery equipment of claim 1, wherein said distilling barrel provides a cooling element mounted on said top lid, and said cooling element is an electric fan.

10. The brewery equipment of claim 1, wherein a cooling element is mounted on said distilling barrel, and an inlet and an outlet are outfitted on said top lid of said cooling element to transfer cooling fluid to said top lid.

11. The brewery equipment of claim 1, wherein said cooling piping includes a funnel type collection cap linked with said distilling cask, a bend piping linked with said collection cap and a valve at said piping end.

12. The brewery equipment of claim 1, wherein said top lid of said distilling barrel provides a formation of a sink fin.

13. The brewery equipment of claim 1, wherein said cask is composed of two layers of walls with a space between said walls.

14. The brewery equipment of claim 1, wherein said top lid provides a touch switch, when said ferment cask is well closed with said top lid, said touch switch is actuated, so does said distilling barrel.

* * * * *